United States Patent [19]

Dejaifve et al.

[11] Patent Number: 4,524,058
[45] Date of Patent: Jun. 18, 1985

[54] PROCESS FOR THE PREPARATION OF A HYDROGEN-RICH GAS

[75] Inventors: Pierre E. Dejaifve; Gerard Quillaud, both of Grand-Couronne, France

[73] Assignee: Shell Oil Company, Houston, Tex.

[21] Appl. No.: 662,462

[22] Filed: Oct. 18, 1984

[30] Foreign Application Priority Data

Nov. 7, 1983 [FR] France ............... 83 17645

[51] Int. Cl.$^3$ .............................. C01B 2/10
[52] U.S. Cl. ..................... 423/656; 502/331
[58] Field of Search ............ 423/656; 502/331

[56] References Cited

U.S. PATENT DOCUMENTS

| | | | |
|---|---|---|---|
| 1,865,770 | 7/1932 | Larson | 502/331 |
| 3,755,556 | 8/1973 | Aldridge | 423/656 |
| 3,899,577 | 8/1975 | Sugier | 423/656 |
| 3,904,386 | 9/1975 | Graboski et al. | 423/656 |
| 4,166,101 | 8/1979 | Neel et al. | 502/314 |

FOREIGN PATENT DOCUMENTS

| | | | |
|---|---|---|---|
| 753027 | 12/1970 | Belgium | 423/656 |
| 6477 | of 1915 | United Kingdom | 502/331 |
| 1213343 | 11/1970 | United Kingdom | 423/656 |

OTHER PUBLICATIONS

Chemical Abstracts, Citation 89-61885(8).

Primary Examiner—John Doll
Assistant Examiner—Wayne A. Langel

[57] ABSTRACT

A process is disclosed for preparing a hydrogen-rich gas, which is carried out by reacting a carbon monoxide-containing gas with steam in the presence of a catalyst. The catalyst contains a spinel whose composition is expressed by the formula $Li_xCu_{(1-x)}Fe_5O_8$ in which $0<x<1$. Preferably a compound of an alkali metal is added to the catalyst.

11 Claims, No Drawings

PROCESS FOR THE PREPARATION OF A HYDROGEN-RICH GAS

BACKGROUND OF THE INVENTION

The present invention relates to a process for the preparation of a hydrogen-rich gas carried out by transforming a carbon monoxide-containing gas with steam according to the water-gas shift reaction $$CO + H_2O \rightarrow CO_2 + H_2$$

This conversion, which constitutes an important part in most of the industrial processes for the preparation of hydrogen, is generally effected in two steps in the presence of a catalyst. The first conversion step, which is performed at a temperature of over 300° C., is known as water-gas shift reaction at elevated temperature. In the second conversion step, the water-gas shift reaction at low temperature, a temperature below 300° C. is used. As most of the catalyst proposed hitherto for the water-gas shift reaction are only sufficiently active in a fairly limited temperature range, it is customary to use different catalysts in each of the two conversion steps as mentioned above.

It has now been found that certain spinels are excellent catalysts for the water-gas shift reaction both in low and high temperature operations. One such catalyst is described in U.S. Pat. No. 4,166,101 where the spinel has the formula $Cu_{0.5}Zn_{0.5}Fe_2O_4$.

SUMMARY OF THE INVENTION

The invention therefore relates to a process for the preparation of a hydrogen-rich gas, which is carried out by transforming a carbon monoxide-containing gas with steam, characterized in that the conversion is effected in the presence of a catalyst containing a spinel whose composition corresponds to the formula $Li_xCu_{(1-x)}Fe_5O_8$ in which $0 < x < 1$.

DETAILED DESCRIPTION OF THE INVENTION

The catalysts used according to the invention are conveniently obtained by kneading a mixed powder of the metals-containing consituents together with water or by precipitating the metals-containing constituents in the desired proportion starting from a solution of their salts, for preference a solution of carbonates and/or nitrates, by drying the kneaded paste or the precipitate and subsequently calcining it, for preference at a temperature from 400° to 1000° C. for a period of three to 20 hours. It has moreover been found that it is possible to stabilize the above-mentioned catalysts by adding a compound of at least one alkali metal. Catalysts containing these constituents retain their activity longer during use, and as a result it is less frequently necessary to regenerate or replace them. It is advantage to use catalysts containing from 0.1 to 15% by weight of Li, Na, K, Rb and/or Cs, calculated on the basis of their oxides. During the water-gas shift process the alkali metals are probably present on the catalyst in the form of their oxides and/or their carbonates.

The above-mentioned catalysts can be used as such: they will be advantageously applied in the form of particles having a length and/or a diameter of 0.2 to 0.6 mm. However, it is also possible to precipitate the catalysts on a carrier and to use them on this carrier, after drying and calcination, for the water-gas conversion reaction. If desired, aluminum trioxide can be used as carrier; the quantity of carrier will suitably be such that it constitutes from 40 to 80% by weight of the total catalyst.

The water-gas conversion reaction, which in principle may take place at temperatures ranging from 175° to 500° C., is generally performed in practice in several steps, for reasons of reaction rate and state of equilibrium, partly above 300° C. (water-gas conversion reaction at elevated temperature) and partly below 300° C. (water-gas shift reaction at low temperature). For preference the reaction is performed by passing the gas to be transformed through two or more reactors at a temperature ranging from 300° to 500° C., the said reactors containing a catalyst for water-gas shift reaction at elevated temperature, and subsequently passing the mixture of partially transformed gas through a reactor at a temperature ranging from 175° to 300° C., the said reactor containing a catalyst for water-gas shift reaction at low temperature.

If the water-gas shift process is applied to several steps at different temperatures, partly above and partly below 300° C., a process according to the invention is anyway preferred for the step at low temperature. Since the catalysts according to the invention also generally feature a sufficient activity and stability above 300° C., it is advantageous to use a catalyst according to the invention in all the steps of the water-gas shift reaction, both above and below 300° C.

The pressure at which the water-gas shift reaction is performed may vary between wide limits. The reaction is for preference performed at a pressure in the range from 10 to 100 bar, in particular from 20 to 80 bar. The quantity of steam present in the gas mixture subjected to the water-gas shift reaction is for preference from 0.5 to 50 moles per mole of carbon monoxide.

The rate at which the gas to be transformed is passed over the catalyst may vary between wide limits, but is for preference from 1,500 to 4,500 liters of gas per hour per liter of catalyst, at normal temperature and pressure.

As has already been mentioned, the preparation of hydrogen-rich gas by conversion of a carbon monoxide-containing gas with steam according to the water-gas shift reaction forms an important part of most of the industrial processes for the preparation of hydrogen. The process according to the invention is very serviceable as part of such a process for the preparation of hydrogen. The carbon monoxide-containing gas is generally obtained in these processes by incomplete combustion of a hydrocarbon or a mixture of hydrocarbons with oxygen. It is preferred to add steam as a modifier to the mixture. The incomplete combustion yields a crude gas which comprises principally carbon monoxide and hydrogen. The mixture of hydrocarbons used is for preference a petroleum fraction. Petroleum fractions, both from distillation and residual, are serviceable for this purpose. Under certain conditions, coal, for example in the form of a slurry in a hydrocarbon oil, may also be used as feed.

It is customary in most of the processes to withdraw heat from the crude gases leaving the combustion reactor, since said gases are at a very elevated temperature. This can be effected very conveniently by causing heat to be exchanged by the gases with the water in a waste heat boiler; as a result high-pressure steam is formed and the temperature of the crude gas falls.

According to the starting material selected and the conditions used in the combustion reactor, the gas thus cooled which, however, is still at a relatively high temperature, can contain a considerable quantity of soot.

Because of the rapid clogging of the catalyst by the soot, the latter has to be removed from the gas before it is subjected to the water-gas catalytic shift reaction, if a conventional reactor is used. However, recently a reactor has been available which allows the catalytic transformation of gases containing solid impurities, such as soot, without the catalyst becoming rapidly clogged by the solid impurities. In this reactor, which contains hollow channels for gas in which the gas can circulate and whose walls are gas-permeable, the catalyst is present behind the walls. This reactor is based on the principle that the constituents to be transformed, which are present in the gas, spread out from the gas channels, through the walls of these channels, come into contact with the catalyst, and spread out again in the gas channels after conversion.

The reactor described above is extremely serviceable if the carbon monoxide-containing gas to be transformed in the process according to the invention contains soot. According to the soot content of the gas, some of the soot, may, if desired, be separated from the gas in advance.

Upon completion of the water-gas conversion reaction, the resultant hydrogen-rich gas for the preparation of pure hydrogen must be purified again. If the crude gaseous mixture leaving the combustion reactor contained sulfur and/or soot, while no sulfur and/or soot has been removed or only some of the soot has been removed before the water-gas conversion reaction, the sulfur and/or the soot must still be removed from the hydrogen-rich gas. The purification of the hydrogen-rich gas further comprises in particular the removal of carboxylic anhydride formed and of non-transformed carbon monoxide.

The following non-limiting examples will show clearly how the invention can be carried out.

EXAMPLE 1

A catalyst having a composition as defined by the formula $Li_{0.2}Cu_{0.8}Fe_5O_8$ was prepared by grinding 1.847 g $Li_2CO_3$, 14.31 g $Cu_2(O)$ and 89.83 g of anhydrous $Fe_2O_3$ and 50.50 g $Fe(NO_3)_3.9H_2O$ to obtain a powder and by drying the resultant paste at 110° C. for 3 hours. The mass was subsequently calcined 1 hour at 400° C. and 2 hours at 800° C.

By means of X-ray diffraction it has been found that the resultant mixed oxides had assumed the crystalline shape of a spinel.

The calcined material was screened, and the particles of a diameter from 0.4 to 0.6 mm were used for the conversion of carbon monoxide into hydrogen with steam.

To this end, a gas having the following composition, together with steam, was passed over a bed formed by the catalyst particles:

|     | % by vol. |
| --- | --- |
| CO | 6 |
| $CO_2$ | 29 |
| $H_2$ | 65. |

The following reaction conditions were used:

| Temperature | 250° C. |
| --- | --- |
| Pressure | 40 bar |
| Space Velocity | 1,500 liters at normal temperature and pressure/1 of catalyst/h |
| Steam/gas molar ratio (V/V) | 0.65 |

34% of the carbon monoxide present in the gas was transformed during the process according to the following reaction:

$$CO + H_2O \rightarrow H_2 + CO_2$$

EXAMPLE 2

A catalyst having a composition as defined by the formula: $94Li_{0.2}Cu_{0.8}Fe_5O_8.6K_2O$ (parts by weight) was prepared by using the same procedure as in Example 1 followed by impregnating the resulting ferrite with an aqueous solution of $K_2CO_3$, drying the impregnated ferrite at 200° C. and finally calcining it for 2 hours at 500° C.

The calcined material was screened, and the particles of a diameter from 0.4 to 0.6 mm were used for the conversion of carbon monoxide into hydrogen with steam, using the same reaction conditions as described in Example 1.

In this case, 63% of carbon monoxide present in the gas was transformed during the process, thus showing the advantageous effect of adding a compound of an alkali metal on the catalyst activity at low temperature.

EXAMPLE 3

In this example the catalyst described in Example 2 was used for the conversion of carbon monoxide with steam at higher temperature: 350° C.

The gas composition was the same as in Example 1 and the following reaction conditions were used:

| Temperature | 350° C. |
| --- | --- |
| Pressure | 40 bar |
| Space Velocity | 1,500 liters at normal temperature and pressure/1 of catalyst/h. |
| Steam/gas molar ratio (V/V) | 0.65 |

40% of the CO present in the feed gas was converted during the process according to the reaction $CO + H_2O \rightarrow H_2 + CO_2$, showing the good activity of the alkali metal oxide-promoted catalyst at a high temperature.

EXAMPLE 4

A catalyst having a composition as defined by the formula $90Li_{0.2}Cu0.8Fe_5O_8.10K_2O$ (parts by weight) was prepared by using the same procedure as in Example 2. The calcined material was screened, and the particles of a diameter from 0.4 to 0.6 mm were used for the conversion of carbon monoxide with at the same conditions as in Example 3. 62% of the CO present in the feed was converted during the process according to the reaction $CO + H_2O \rightarrow H_2 + CO_2$ showing the even better activity of the catalyst at a high temperature if the alkali metal content thereof was increased.

What is claimed is:

1. A process for the preparation of a hydrogen-rich gas by reacting a carbon monoxide-containing gas with stream under suitable conditions in the presence of a catalyst, wherein said catalyst comprises a spinel having the formula $Li_xCu(1-x)Fe_5O_8$ in which $0<x1$.

2. A process as claimed in claim 1, characterized in that the catalyst also contains a compound of at least one alkali metal.

3. A process as claimed in claim 2, characterized in that the catalyst contains from 0.1 to 15% by weight of at least one alkali metal, calculated as its oxide.

4. A process as claimed in claim 1, characterized in that the catalyst contains a carrier.

5. A process as claimed in claim 4, characterized in that the carrier content of the catalyst is from 40 to 80% by weight.

6. A process as claimed in claim 1, characterized in that the reaction is performed at a temperature from 175° to 500° C., a pressure of 10 to 100 bar, a space velocity of 1,500 to 4,500 liters of gas per hour per liter of catalyst at normal temperature and pressure and in a molar ratio of steam in relation to carbon monoxide of 0.5 to 50.

7. A process as claimed in claim 2, characterized in that the catalyst contains a carrier.

8. A process as claimed in claim 7, characterized in that the carrier content of the catalyst is from 40 to 80% by weight.

9. A process as claimed in claim 3, characterized in that the catalyst contains a carrier.

10. A process as claimed in claim 9, characterized in that the carrier content of the catalyst is from 40 to 80% by weight.

11. A process as claimed in claim 10, characterized in that the reaction is performed at a temperature from 175° to 500° C., a pressure of 10 to 100 bar, a space velocity of 1,500 to 4,500 liters of gas per hour per liter of catalyst at normal temperature and pressure and in a molar ratio of steam in relation to carbon monoxide of 0.5 to 50.

* * * * *